(12) United States Patent
Zhou et al.

(10) Patent No.: US 9,749,893 B2
(45) Date of Patent: *Aug. 29, 2017

(54) WIRELESS COMMUNICATION INTERFERENCE MITIGATION

(71) Applicant: Intel Deutschland GmbH, Neubiberg (DE)

(72) Inventors: Guangxia Zhou, Munich (DE); Gerhard Bauch, Munich (DE); Wen Xu, Neubiberg (DE)

(73) Assignee: Intel Deutschland GmbH, Neubiberg (DE)

(\*) Notice: Subject to any disclaimer, the term of this patent is extended or adjusted under 35 U.S.C. 154(b) by 0 days.

This patent is subject to a terminal disclaimer.

(21) Appl. No.: 15/166,984

(22) Filed: May 27, 2016

(65) Prior Publication Data

US 2017/0094544 A1    Mar. 30, 2017

Related U.S. Application Data

(63) Continuation of application No. 13/434,697, filed on Mar. 29, 2012, now Pat. No. 9,363,766.

(51) Int. Cl.
*H04W 24/10* (2009.01)
*H04W 52/24* (2009.01)
(Continued)

(52) U.S. Cl.
CPC .......... *H04W 24/10* (2013.01); *H04B 7/0413* (2013.01); *H04L 5/0057* (2013.01);
(Continued)

(58) Field of Classification Search
CPC .............. H04W 24/10; H04W 52/243; H04W 72/0473; H04W 72/0453; H04W 52/40;
(Continued)

(56) References Cited

U.S. PATENT DOCUMENTS 9,363,766 B2   6/2016  Zhou et al.
2008/0188260 A1  8/2008  Xiao et al.
(Continued)

FOREIGN PATENT DOCUMENTS

| CN | 101601198 A | 12/2009 |
| CN | 102076072 A | 5/2011 |
| CN | 103368633 A | 10/2013 |

OTHER PUBLICATIONS

"U.S. Appl. No. 13/434,697, Advisory Action mailed Dec. 3, 2014", 3 pgs.
(Continued)

*Primary Examiner* — Ian N Moore
*Assistant Examiner* — Brian T Le
(74) *Attorney, Agent, or Firm* — Schwegman Lundberg & Woessner, P.A.

(57) ABSTRACT

Described herein are implementations related to communication in a wireless communication system. In one implementation, serving signals from serving base stations and interfering signals from neighbor base stations are split into multiple substreams. A power allocation algorithm is used to calculate the power amplitude factor of the substreams communicated from the serving based stations coupled to corresponding wireless devices. A control signaling related to this implementation is described.

17 Claims, 6 Drawing Sheets

(51) Int. Cl.
  *H04W 72/04* (2009.01)
  *H04B 7/0413* (2017.01)
  *H04L 27/26* (2006.01)
  *H04L 5/00* (2006.01)

(52) U.S. Cl.
  CPC ....... *H04L 27/2601* (2013.01); *H04W 52/243* (2013.01); *H04W 72/0453* (2013.01); *H04W 72/0473* (2013.01)

(58) Field of Classification Search
  CPC ..... H04W 52/24; H04B 7/0413; H04B 15/00; H04L 27/2601; H04L 5/0057
  See application file for complete search history.

(56) References Cited

U.S. PATENT DOCUMENTS

| | | |
|---|---|---|
| 2008/0219364 A1 | 9/2008 | Hui et al. |
| 2008/0227422 A1 | 9/2008 | Hwang et al. |
| 2012/0195271 A1 | 8/2012 | Lee et al. |
| 2013/0039193 A1 | 2/2013 | Yin et al. |
| 2013/0182634 A1 | 7/2013 | Tulino et al. |
| 2013/0258869 A1 | 10/2013 | Zhou et al. |

OTHER PUBLICATIONS

"U.S. Appl. No. 13/434,697, Final Office Action mailed Sep. 11, 2014", 26 pgs.
"U.S. Appl. No. 13/434,697, Non Final Office Action mailed Mar. 21, 2014", 24 pgs.
"U.S. Appl. No. 13/434,697, Non Final Office Action mailed Jun. 30, 2015", 30 pgs.
"U.S. Appl. No. 13/434,697, Notice of Allowance mailed Jan. 29, 2016", 16 pgs.
"U.S. Appl. No. 13/434,697, PTO Response to Rule 312 Communication mailed May 12, 2016", 2 pgs.
"U.S. Appl. No. 13/434,697, Response filed Aug. 2, 2014 to Non-Final Office Action dated Mar. 21, 2014", 10 pgs.
"U.S. Appl. No. 13/434,697, Response filed Sep. 30, 2015 to Non Final Office Action mailed Jun. 30, 2015", 14 pgs.
"U.S. Appl. No. 13/434,697, Response filed Nov. 11, 2014 to Final Office Action mailed Sep. 11, 2014", 10 pgs.
"Chinese Application Serial No. 201310199548.9, Office Action mailed Mar. 7, 2016", 6 pgs.
"Chinese Application Serial No. 201310199548.9, Office Action mailed Aug. 4, 2015", 13 pgs.
"Chinese Application Serial No. 201310199548.9, Response filed Dec. 21, 2015 to Office Action mailed Aug. 4, 2015", 3 pgs.
Kumar, Swarun, et al., "Bringing cross-layer MIMO to today's wireless LANs", ACM SIGCOMM Computer Communication Review, 43(4), (Oct. 2013), 387-398.

WIRELESS COMMUNICATION INTERFERENCE MITIGATION

This application is a continuation of U.S. patent application Ser. No. 13/434,697, filed Mar. 29, 2012, now issued as U.S. Pat. No. 9,363,766 B2 which is incorporated herein by reference in its entirety.

BACKGROUND

Single frequency reuse is widely used in current state-of-the-art wireless systems, such as Long Term Evolution Advanced (LTE-A), to deal with the increasing average cell throughput with limited to no bandwidth expansion. If interference mitigation techniques are absent in these systems, the cell-edge user equipments (UEs) will suffer from strong interference from adjacent cells which degrades UE throughput. In order to improve the average cell throughput as well as the cell-edge UE throughput, a powerful interference mitigation technique is an inevitable part of wireless systems.

Different interference mitigation techniques have been proposed recently. The first interference mitigation category uses fractional frequency reuse (FFR), which is widely discussed in Long Term Evolution (LTE). In general, the concept of FFR entails allocating all available partitions of a frequency band to service UE near the center of a cell while restricting transmission to UEs near the edges of a cell to only a fraction of the available band. FFR configurations alleviate interference experienced by UEs of neighboring sectors of different cells.

Various methods for assigning frequency partitions within an FFR framework have been developed. One such method assigns each sector of a cell with a priority on a set of frequency partitions. Here, partitions to which a sector holds a higher priority are utilized for data transmission in the sector and, over time, data transmission in the sector is gradually expanded to frequency partitions to which the sector holds lower priorities. In other methods, arbitrary physical resource unit assignment is permitted and instantaneous channel gain is assumed for the utility computations. In addition, FFR schemes have been proposed in which the transmission power on each frequency partition is dynamically adjusted. However, arbitrary transmission power on each frequency partition is permitted. In these methods, complicated derivative computation is employed.

A second interference mitigation category adopts coordinated beamforming, also known as coordinated multi-point transmission (CoMP). The essence of the current CoMP schemes is to let BSs coordinate beamforming in order to reduce inter-cell interference. But the coordination requires enormous overhead on the air interface and over the backhaul since complete channel state information (CSI) needs to be shared among BSs. Moreover, although CoMP schemes may be effective in minimizing inter-cell interference, the interference may still exist along joined areas between neighboring cells A third interference mitigation category uses rate-splitting-based interference mitigation. In rate-splitting-based interference mitigation, transmitted data streams are split into two parts: the common data stream that is decoded at a plurality of UEs, and the private data stream that is decoded only at intended UEs. By decoding the common data stream of the interference, part of the interference is canceled, and consequently UE throughput can be improved.

The Detailed Description references the accompanying figures. In the figures, the left-most digit(s) of a reference number identifies the figure in which the reference number first appears. The same numbers are used throughout the drawings to reference like features and components. Also, note that any text smaller than ten point is presented merely to indict where text would appear in the depicted figures. Since such text is merely an indicator of where text might appear, the content of such text is unimportant to the understanding the implementations depicted.

DETAILED DESCRIPTION

Described herein are implementations related to communication in a wireless communication system. In one implementation, serving signals from serving base stations and interfering signals from neighbor base stations are split into multiple substreams. A power allocation algorithm is used to calculate a power amplitude factor for use in the wireless communication system.

Figure 1:
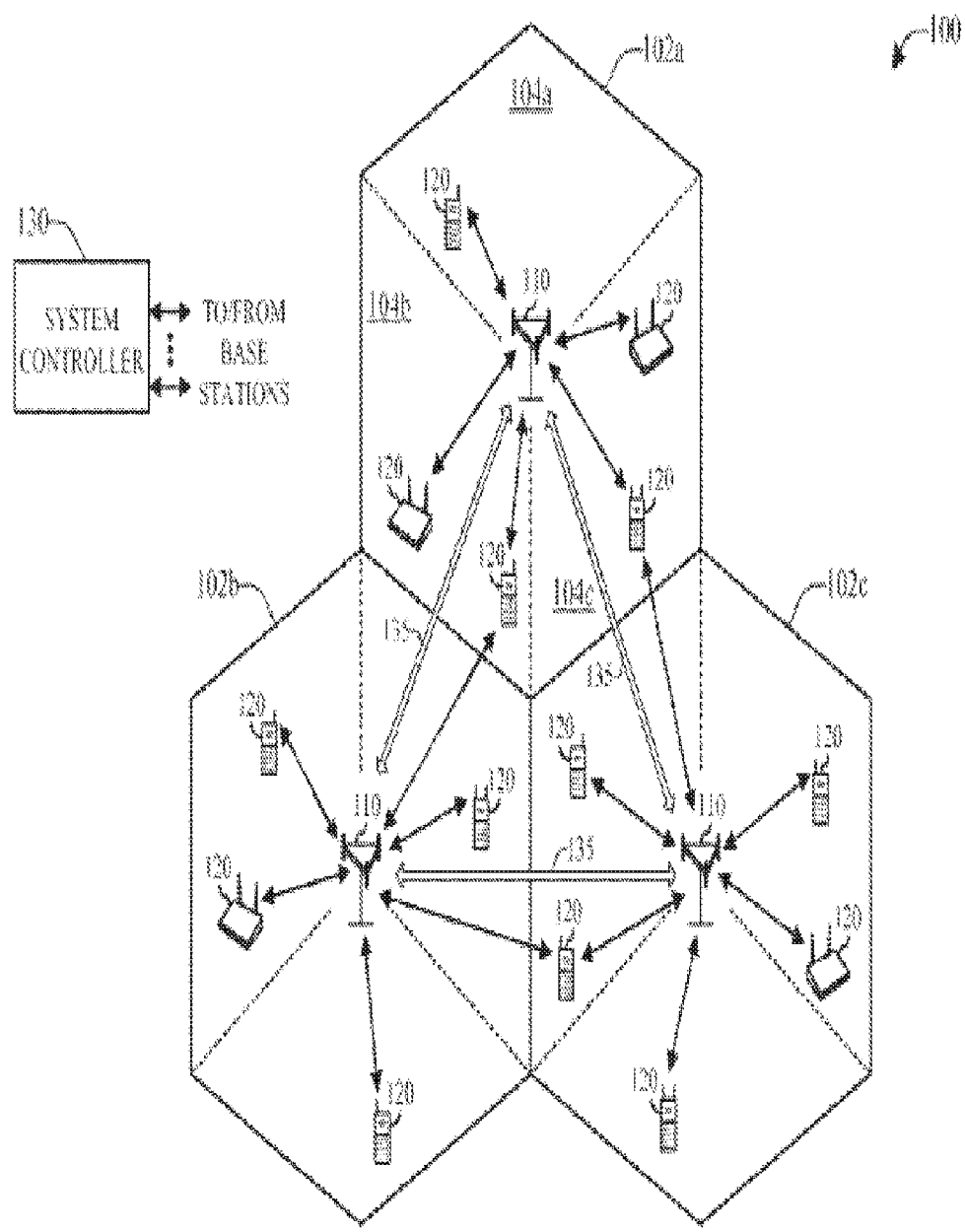
FIG. 1 illustrates an example wireless communication system in accordance with various implementations described herein.

Referring now to the drawings, FIG. 1 is an illustration of a wireless communication system 100 in accordance with various implementations. In one example, the wireless communication system 100 includes multiple base stations (BSs) 110 and multiple terminals 120 or user equipment (UEs). Further, one or more BSs 110 can communicate with one or more UEs 120. By way of non-limiting example, a BS 110 can be an access point, a Node B, and/or another appropriate network entity. Each BS 110 provides communication coverage for a particular geographic area 102a-c. As used herein and generally in the art, the term "cell" can refer to a base station 110 and/or its coverage area 102a-c depending on the context in which the term is used.

To improve system capacity, the coverage area 102a, 102b, or 102c corresponding to a BS 110 can be partitioned into multiple smaller areas (e.g., areas 104a, 104b, and 104c). Each of the smaller areas 104a, 104b, and 104c can be served by a respective base transceiver subsystem (BTS, not shown). As used herein and generally in the art, the term "sector" can refer to a BTS and/or its coverage area depending on the context in which the term is used. In one example, sectors 104a, 104b, 104c in a cell 102a, 102b, 102c can be formed by groups of antennas (not shown) at BS 110, where each group of antennas is responsible for communication with UEs 120 in a portion of the cell 102a, 102b, or 102c. For example, a base station 110 serving cell 102a can have a first antenna group corresponding to sector 104a, a second antenna group corresponding to sector 104b, and a third antenna group corresponding to sector 104c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" or BS as used herein can refer both to a station that serves a sector as well as a station that serves a cell. As further used herein, a "serving" access point is one with which a terminal has uplink traffic (data) transmissions, and a "neighbor" (non-serving) access point is one with which a terminal can have downlink traffic and/or both downlink and uplink control transmissions but no uplink traffic. It should be appreciated that as used herein, a downlink sector in a disjoint link scenario is a neighbor sector. While the following description generally relates to a system in which each terminal communicates with one serving access point for simplicity, it should be appreciated that terminals can communicate with any number of serving access points.

In accordance with one aspect, UEs 120 can be dispersed throughout the system 100. Each UE 120 can be stationary or mobile. By way of non-limiting example, a UE 120 can be a wireless device, a cellular phone, a personal digital assistant (PDA), a wireless modem, a handheld device, an access terminal (AT), a mobile station, a user equipment, a subscriber station, or another appropriate device. Further, a UE 120 can communicate with any number of BSs 110 or no BSs 110 at any given moment.

In another example, the system 100 can utilize a centralized architecture by employing a system controller 130 that can be coupled to one or more of the BSs 110 and provide coordination and control for the BSs 110. In accordance with alternative aspects, system controller 130 can be a single network entity or a collection of network entities. Additionally, the system 100 can utilize a distributed architecture to allow the base stations 110 to communicate with each other as needed. Backhaul network communication can facilitate point-to-point communication between base stations employing such a distributed architecture. In one example, system controller 130 can additionally contain one or more connections to multiple networks. These networks can include the Internet, other packet based networks, and/or circuit switched voice networks that can provide information to and/or from UEs 120 in communication with one or more BSs 110 in system 100. In another example, system controller 130 can include or be coupled with a scheduler that can schedule transmissions to and/or from UEs 120. Alternatively, the scheduler can reside in each individual cell 102, each sector 104, or a combination thereof.

In an example, system 100 can utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different UEs 120 are orthogonalized by transmitting in different time intervals. FDMA utilizes frequency division multiplexing (FDM), wherein transmissions for different UEs 120 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes) even though they are sent in the same time interval or frequency subcarrier. OFDMA utilizes Orthogonal Frequency Division Multiplexing (OFDM), and SC-FDMA utilizes Single-Carrier Frequency Division Multiplexing (SC-FDM), OFDM and SC-FDM can partition the system bandwidth into multiple orthogonal subcarriers (e.g., tones, bins, . . . ), each of which can be modulated with data. Typically, modulation symbols are sent in the frequency domain with OFDM and in the time domain with SC-FDM. Additionally and/or alternatively, the system bandwidth can be divided into one or more frequency carriers, each of which can contain one or more subcarriers. System 100 can also utilize a combination of multiple-access schemes, such as OFDMA and CDMA. While the power control techniques provided herein are generally described for an OFDMA system, it should be appreciated that the techniques described herein can similarly be applied to any wireless communication system.

In another example, BSs 110 and UEs 120 in system 100 can communicate data using one or more data channels and signaling using one or more control channels. Data channels utilized by system 100 can be assigned to active UEs 120 such that each data channel is used by only one UE at any given time. Alternatively, data channels can be assigned to multiple UEs 120, which can be superimposed or orthogonally scheduled on a data channel. To conserve system resources, control channels utilized by system 100 can also be shared among multiple UEs 120 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

Figure 2:
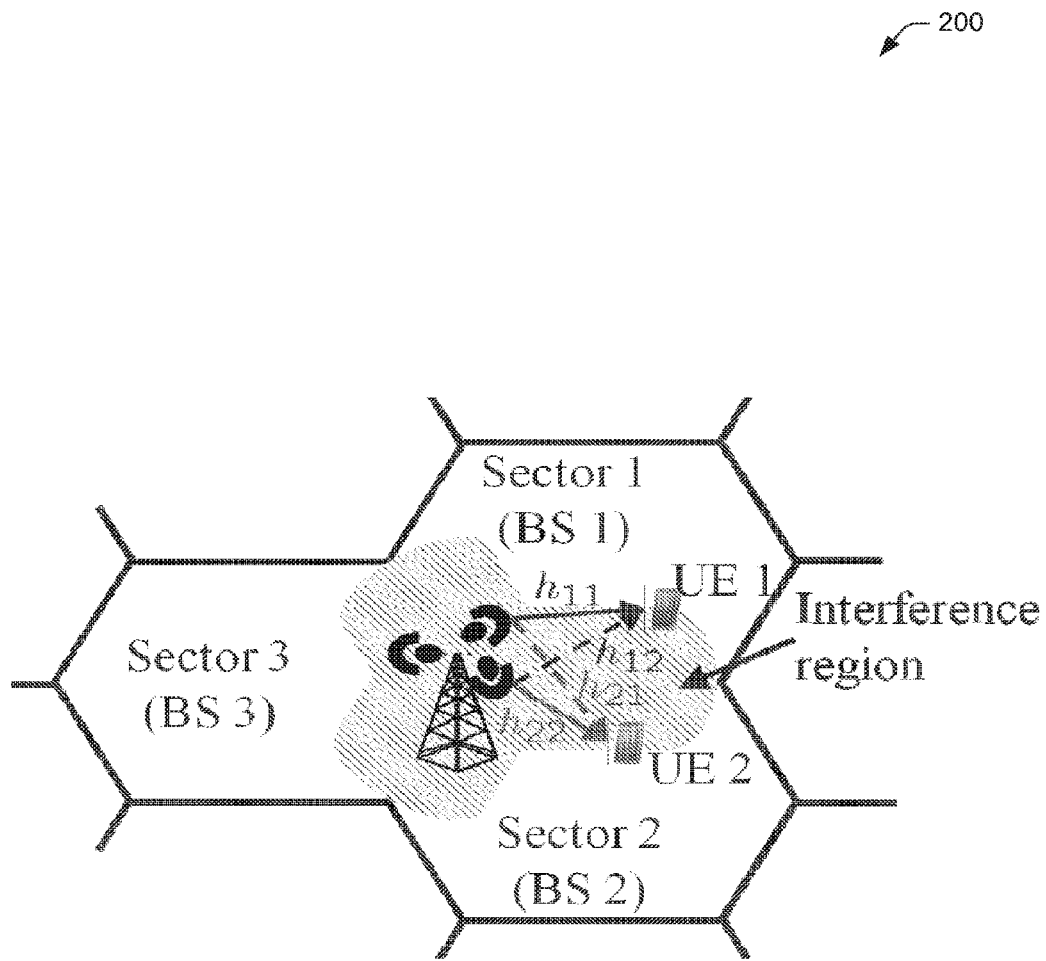
FIG. 2 illustrates particulars of a downlink OFDMA according to at least one implementation.

For the sake of completeness, FIG. 2 illustrates particulars of a downlink OFDMA 200 according to at least one implementation. As is illustrated, BS 1 is the serving BS for UE 1 and BS 2 is the serving BS for UE 2. BS 1 and BS 2 may be of the type illustrated in FIG. 1 (e.g., BS 110), and UE 1 and UE 2 may be of the type illustrated in FIG. 1 (e.g., UE 120). In this example, each BS (i.e., BS 1 and BS 2) is assumed to use one directional transmit antenna to serve a sector (e.g., sector 1), and there is one UE served by each BS. Furthermore, it is assumed that UE 1 and UE 2 are geographically close to each other. Therefore, UE 1 and UE 2 receive interference from each other. The received signals, $r_1$ and $r_2$, of UE 1 and UE 2 may be written as follows:

$$r_1 = h_{11}s_1 + h_{12}s_2 + \underbrace{\eta_1 + \omega_1}_{n_1} \quad (1)$$

$$r_2 = h_{21}s_1 + h_{22}s_2 + \underbrace{\eta_2 + \omega_2}_{n_2},$$

where $h_{ij}$ denotes the independent Rayleigh fading channel gains from BS j to UE i. $h_{11}$, $h_{22}$, $h_{12}$ and $h_{21}$ are independently identically distributed zero-mean comples Gaussian random variables with variances $\sigma_{11}^2$, $\sigma_{22}^2$, $\sigma_{12}^2$ and $\sigma_{21}^2$, respectively, where $\sigma_{ij}^2$ reflects the channel propagation loss from BS j to UE i. $s_i$ is the transmitted symbol with covariance $\sigma_{s,i}^2 = \epsilon[|s_i|^2] = P_{s,i}$ at BS i. $\eta_i$ and $\omega_i$ are the interference caused by other BSs and independent identically distributed additive white Gaussian noise (AWGN) samples, respectively. $\eta_i$ is considered noise herein, therefore the covariance of the noise $\eta_i$ is given by:

$$\Phi_{nn,i} = \epsilon[|n_i|^2] = \epsilon[|\eta_i|^2] + \epsilon[|w_i|^2] = \sigma_{n,i}^2.$$

Furthermore, the received power from UE i from its serving BS (e.g., BS 1) is $\sigma_{\gamma,i}^2 = \sigma_{ii}^2 \sigma_{s,i}^2$, and the received power from UE i from its interfering BS (e.g., BS 2) is $\sigma_{\mu,i}^2 = \sigma_{ij}^2 \sigma_{s,j}^2$ with (i≠j). The signal-to-interference-plus-noise ratio (SINR) is given by $$SINR_i := \frac{\sigma_{\gamma,i}^2}{\sigma_{\mu,i}^2 + \sigma_{n,i}^2}$$

the signal-to-noise ratio (SNR) by $$SNR_i := \frac{\sigma_{\gamma,i}^2}{\sigma_{n,i}^2},$$

and the interference-to-noise ratio (INR) by $$INR_i := \frac{\sigma_{\mu,i}^2}{\sigma_{n,i}^2}.$$

Figure 3:
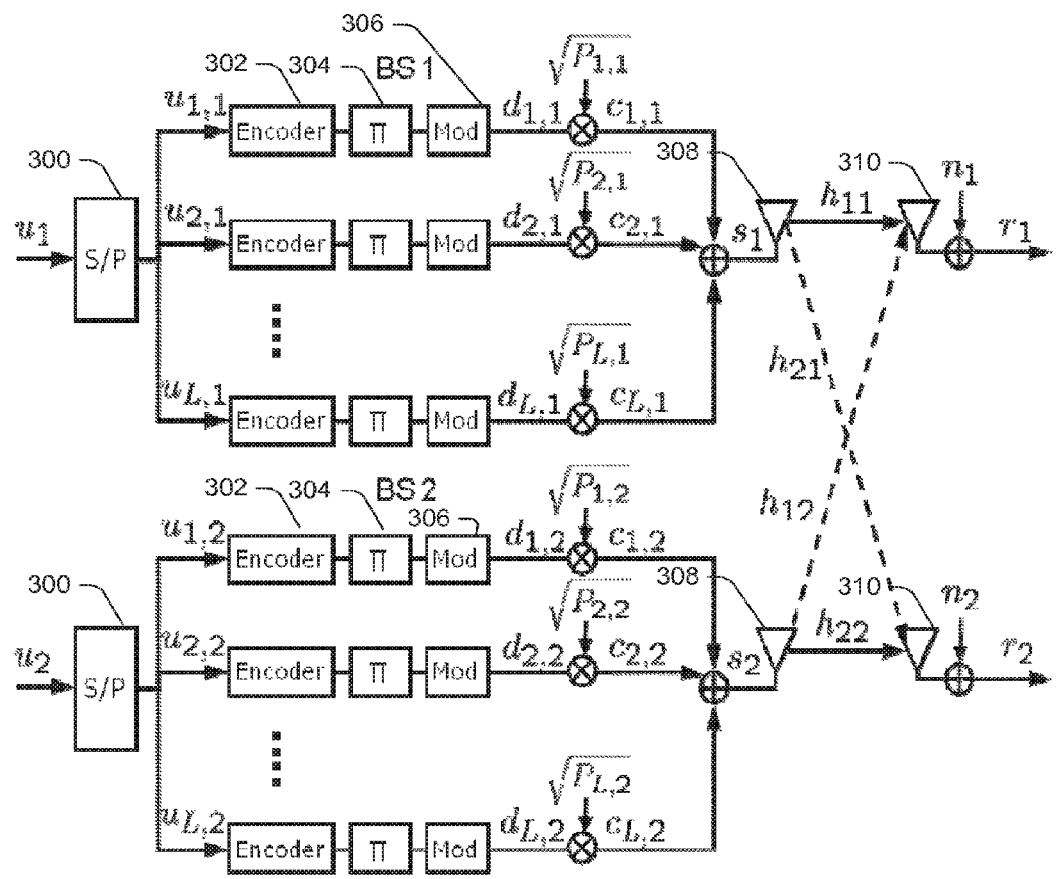
FIG. 3 illustrates exemplary particulars of two base stations.

FIG. 3 illustrates exemplary particulars of BS 1 and BS 2. Each BS i may include a splitter 300, encoder 302, interleaver 304, modulator 306 and at least one antenna 308. In addition, each BS i may transmit signals that are received by an antenna 310, that is associated with a UE (e.g., UE 1 or UE 2). In one implementation, BS i splits its data stream into L substreams. Each substream $u_{l,i}$ (l=1, ..., L) is separately encoded, interleaved and modulated to obtain a symbol substream $d_{l,i}$. The symbol substream $d_{l,i}$ is multiplied with a certain amplitude factor $\sqrt{P_{l,i}}$. The result of the multiplication is noted in FIG. 3 as $c_{l,i}$. Each $c_{l,i}$ is superimposed together, which provides a transmit signal $s_i$:

$$s_i = \sum_{l=1}^{L} c_{l,i} = \sum_{l=1}^{L} d_{l,i}\sqrt{P_{l,i}}, \quad (2)$$

where $P_{s,i} = \sum_{l=1}^{L} P_{l,i}$. The amplitude factor $\sqrt{P_{l,i}}$ is calculated using a power allocation algorithm that is provided in this disclosure.

Figure 4:
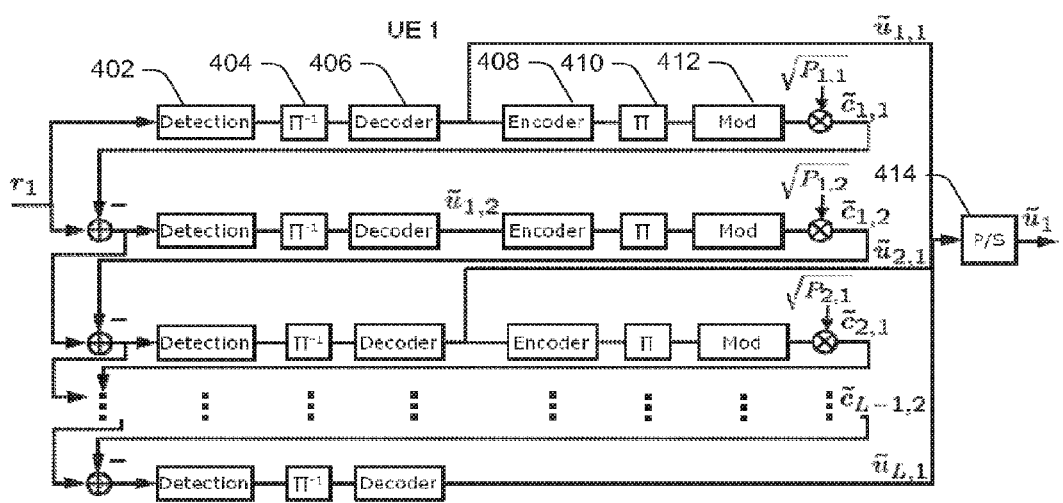
FIG. 4 illustrates exemplary particulars of a user equipment.

FIG. 4 illustrates exemplary particulars of UE 1. Such particulars may also apply to UE 2. The UE 1 is to receive the $r_1$ signal introduced in the foregoing. As illustrated, the UE 1 may include a detection unit 402, a de-interleaver 404, a decoder 406, an encoder 408, an interleaver 410, a modulator 412 and a parallel-to-serial (P/S) converter 414. According to one implementation, UE 1 receives 2L parallel substreams (see equations (1) and (2)). Those substreams include L substreams transmitted by BS 1 and indexed by substream number l (l=1, . . . , L), and L substreams transmitted by BS 2 and indexed by substream number l (l=1, . . . , L).

The UE 1 implements a successive interference cancellation (SIC) that implements the following: (1) the low-index substream is decoded and subtracted from the received signal $r_1$ and then the high-index substream is processed; (2) if the substreams have the same index, the substream from the serving BS is decoded and subtracted, followed by the substream from the interfering BS; and (3) decoder decisions on the code bits are incorporated in the SIC loop. According to the foregoing, $c_{1,1}$ is decoded and subtracted from signal $r_1$, then $c_{1,2}$. Then $c_{1,2}$ is decoded and subtracted from signal $r_1$, and so on until $c_{L,1}$ is decoded. Decoding $c_{L,2}$ is not necessary. Estimated substreams $u_{l,1}$ are thereby produced and combined by P/S 414.

As indicated above, amplitude factor $\sqrt{P_{l,i}}$ is calculated using a power allocation algorithm. The power allocation algorithm may be expressed as follows:

Initialize $P_i \leftarrow \left[\frac{P_{s,i}}{L}, \ldots, \frac{P_{s,i}}{L}\right], \forall i$;

$P_{-1} \triangleq P_2, P_{-2} \triangleq P_1$;
repeat
    repeat
        for i ← 1 to 2 do
            $P_i \leftarrow$ call MLWFA by keeping $P_{-i}$ fixed;
            $T_i \leftarrow \Pi_{l=1}^{L} \Gamma_{l,i}$;
        end
    until the desired accuracy is reached;
    $P_{-1} \triangleq [\hat{P}_{L,1}, P_2], P_{-2} \triangleq [\hat{P}_{L,2}, P_1]$;
    for i ← 1 to 2 do
        $\hat{P}_{L,i} \leftarrow P_{L,i} \pm \delta$;
        $\hat{P}_i \leftarrow$ call MLWFA by keeping $P_{-j}$ fixed;
        if $\hat{T}(\hat{P}_i, P_j) > T, i \neq j$ then
            $P_i \leftarrow \hat{P}_i$;
        end
    end
until $\hat{T}(\hat{P}_i, P_j) < T, \forall i, i \neq j$;

The power allocation algorithm is designed to maximize system utility $T=T_1 \times T_2$ for both UE 1 and UE 2. The product of the SINR ($\Gamma_{l,i}$) per substream $c_{l,i}$ is chosen as the system utility function for BS i: $T_i = \Pi_{l=1}^{L} \Gamma_{l,i}$, since this utility function can maintain a balance between sum-rate and fairness for substreams. The algorithm has two stages, an inner stage and an outer stage. The (1) inner stage adopts an iterative multi-level water-filling procedure: UE 1 first updates power allocation based on a multi-level water-filling algorithm (MLWFA) under the assumption that the power allocation of UE 2 is fixed. The MLWFA is expressed as:

$$P_{l,i} = \frac{1}{E_{l,i} + \mu}, \quad \sum_{l=1}^{L} P_{l,i} = P_{s,i}, \text{ and } \mu \geq 0$$

$$E_l = \begin{cases} 0, & l = 1; \\ \sum_{k=1}^{l-1} \frac{1}{D_k + P_{s,i} - \sum_{m=1}^{k} P_{m,i}}, & l = 2, \ldots, L, \end{cases}$$

$$D_l = \begin{cases} \max\left\{\frac{\sigma_{n,1}^2}{\sigma_n^2} + \frac{\sigma_{ij}^2}{\sigma_{ii}^2}\sum_{k=l}^{L} P_{k,j}, \\ \frac{\sigma_{n,j}^2}{\sigma_{ji}^2} + \frac{\sigma_{ij}^2}{\sigma_{ji}^2}\sum_{k=l+1}^{L} P_{k,j}\right\}, & l = 1, \ldots, L-1; \\ \frac{\sigma_{n,i}^2}{\sigma_n^2} + \frac{\sigma_{ij}^2}{\sigma_n^2} P_{L,j}, & l = L. \end{cases}$$

The MLWFA is provided herein by way of example only. Other MLWFAs may also be used in conjunction with the implementations described herein.

In the outer stage of the power allocation algorithm, an optimum power allocation for both UEs is to be found. That is, as is evident from the algorithm, the power allocation for each UE is adjusted in accordance with the outcome of the inner iterative MLWFA. In particular, a trial of increasing or decreasing the power of the last substream $c_{L,i}$ is made, then the MLWFA is called to calculate a new optimal power allocation, assuming the power allocation of $c_{L,i}$ of the other UE is fixed. The power allocation remains unchanged unless the new system utility value $\hat{T}$ is larger than the current value T. In such a scenario, the power allocation for UE i is updated. The outer stage converges when the maximal T is found. Note, the algorithm provides good results with δ=3dB.

Figure 5:
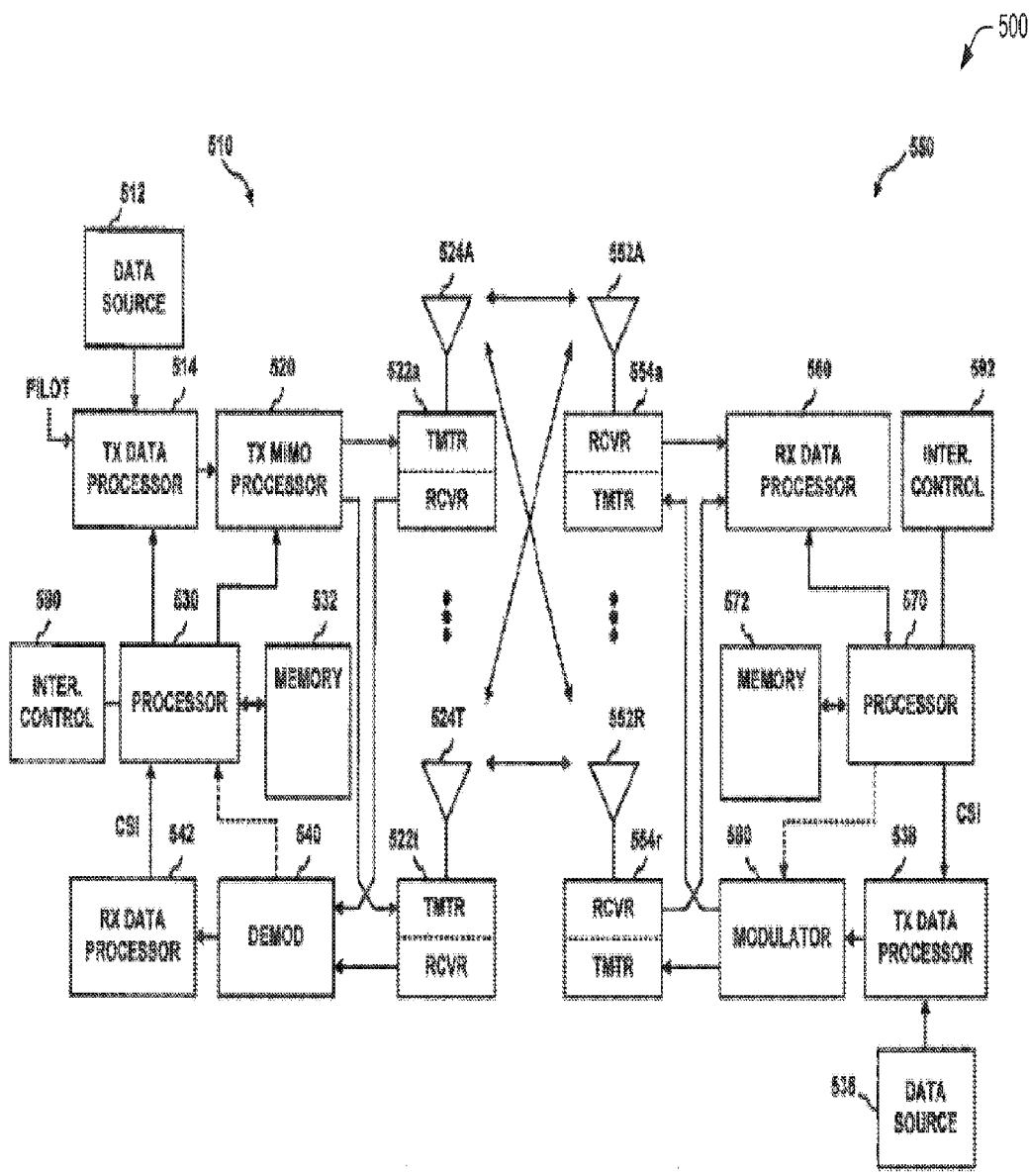
FIG. 5 shows a diagram illustrating an embodiment of a detailed wireless communication system, in accordance with aspects of the disclosure.

FIG. 5 shows a diagram illustrating an embodiment of a communication system 500, in accordance with aspects of the disclosure. The teachings herein may be incorporated into a node (e.g., a device) employing various components for communicating with at least one other node. FIG. 5 depicts several sample components that may be employed to facilitate communication between nodes. For instance, FIG. 5 illustrates a device 510 (e.g., a BS) and a wireless device 550 (e.g., a UE) of a system 500. At the device 510, traffic data for a number of data streams is provided from a data source 512 to a transmit ("TX") data processor 514. The system 500 is illustrated as implementing MIMO, but is not limited as such. For example, the system 500 may also implement SISO. The techniques of the implementations described herein function with MIMO and SISO implementations.

In some aspects, each data stream is transmitted over a respective transmit antenna. The TX data processor 514 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 530. A memory 532 may store program code, data, and other information used by the processor 530 or other components of the device 510.

The modulation symbols, for all data streams are then provided to a TX MIMO processor 520, which may further process the modulation symbols (e.g., for OFDM). The TX MIMO processor 520 then provides modulation symbol streams to transceivers ("XCVR") 522a through 522t that each has a transmitter (TMTR) and receiver (RCVR).

Each transceiver 522a-522t receives and processes a respective symbol stream to provide one or more analog signals, and further conditions (e.g., amplifies, filters, and upconverts) the analog signals to provide a modulated signal suitable for transmission over a MIMO channel. Modulated signals from transceivers 522a through 522t are then transmitted from antennas 524a through 524t, respectively.

At the device 550, the transmitted modulated signals are received by antennas 552a through 552r and the received signal from each antenna 552a-552r is provided to a respective transceiver ("XCVR") 554a through 554r. Each transceiver 554a-554r conditions (e.g., filters, amplifies, and downconverts) a respective received signal, digitizes the conditioned signal to provide samples, and further processes the samples to provide a corresponding "received" symbol stream.

In an aspect of the disclosure, a receive ("RX") data processor 560 then receives and processes the received symbol streams from transceivers 554a-554r based on a particular receiver processing technique to provide "detected" symbol streams. The RX data processor 560 then demodulates, de-interleaves, and decodes each detected symbol stream to recover the traffic data for the data stream. The processing by the RX data processor 560 is complementary to that performed by the TX MIMO processor 520 and the TX data processor 514 at the device 510.

In an aspect of the disclosure, the reverse link message may comprise various types of information regarding the communication link and/or the received data stream. The reverse link message is then processed by a TX data processor 538, which also receives traffic data for a number of data streams from a data source 536, modulated by a modulator 580, conditioned by the transceivers 554a through 554r, and transmitted back to the device 510.

At device 510, the modulated signals from the device 550 are received by the antennas 524a-524t, conditioned by the transceivers 522a-522t, demodulated by a demodulator ("DEMOD") 540, and processed by a RX data processor 542 to extract the reverse link message transmitted by the device 550.

Figure 6:
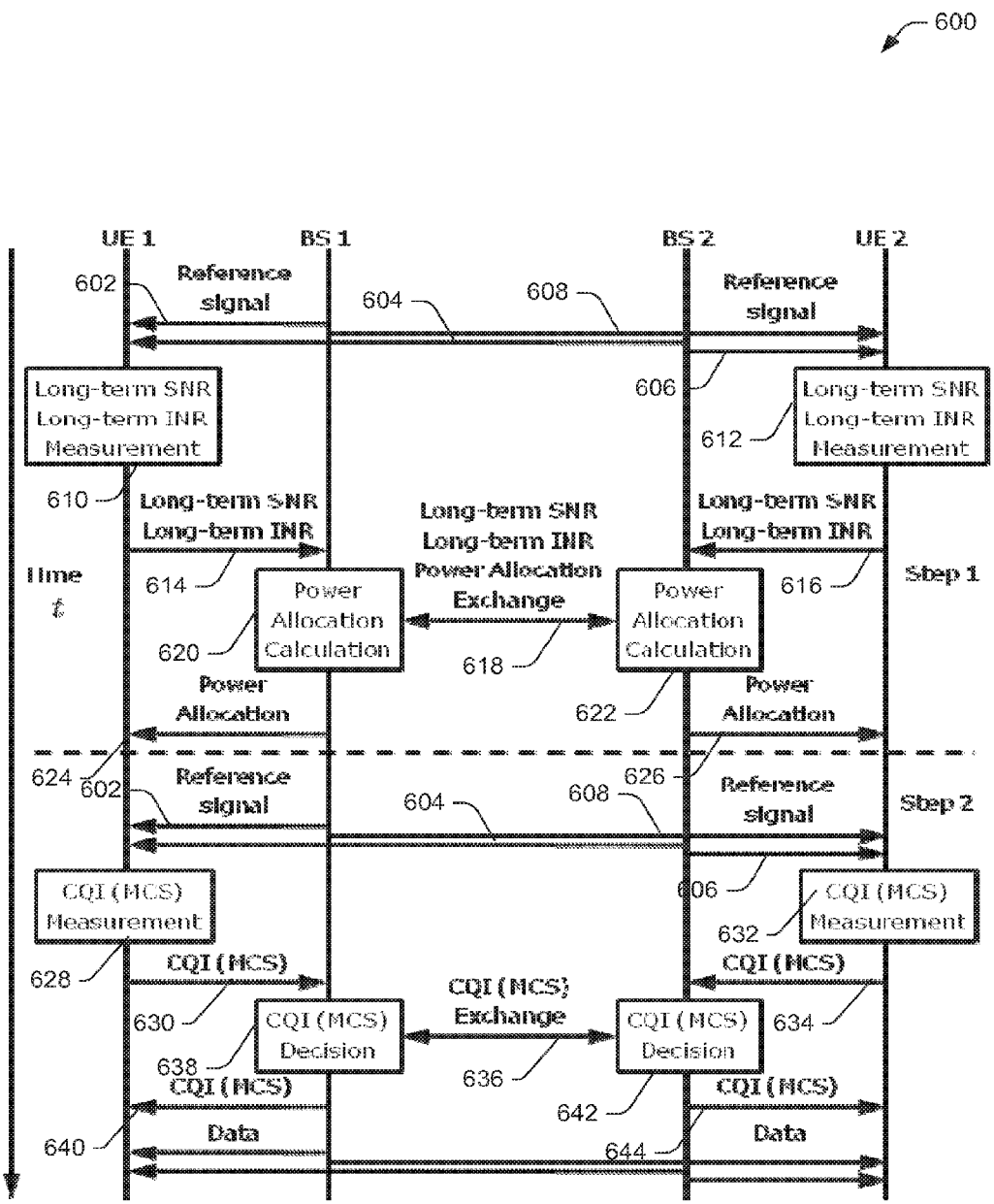
FIG. 6 illustrates an exemplary process that implements the implementations described herein.

FIG. 6 illustrates an exemplary process 600 that implements the implementations described herein. The exemplary process 600 may be performed, at least in part, by user equipment and base stations, such as UE 1 and UE 2, as well as BS 1 and BS 2. Each such device has been discussed in this disclosure.

As is illustrated in FIG. 6, in step 1, power distribution is determined. As part of the power distribution process, UE 1 may receive a reference signal 602 from a serving BS 1 and a reference signal 604 from an interfering BS 2. Furthermore, UE 2 may receive a reference signal 606 from the serving BS 2 and a reference signal 608 from the interfering BS 1. The reference signal 602 enables the UE 1 to obtain channel information from BS 1. Such channel information may include SNR and INR 610. Similarly, the reference signal 604 enables the UE 1 to obtain channel information from BS 2. Such channel information may include SNR and INR 610. In a similar manner, the reference signal 606 enables the UE 2 to obtain channel information from BS 2, which is the serving BS. Such channel information may include SNR and INR 612. Similarly, the reference signal 608 enables the UE 2 to obtain channel information from BS 1, which is the interfering BS. Such channel information may include SNR and INR 612.

Next, UE 1 sends 614 the channel information 610 to BS 1, which is the serving BS. And UE 2 sends 616 the channel information 612 to BS 2, which is the serving BS. At 618, BS 1 shares the channel information 610 with BS 2. Furthermore, at 618, BS 2 shares the channel information 612 with BS 1.

At 620, BS 1 determines power allocation 624 to UE 1 based on the channel information 610 supplied by UE 1 and the channel information 612 supplied by UE 2. In one implementation, the power allocation algorithm described in this disclosure is used to determine the power allocation 624 to UE 1, and in one implementation, the amplitude factor $\sqrt{P_{l,i}}$ used by UE 1. At 622, BS 2 determines power allocation 626 to UE 2 based on the channel information 612 supplied by UE 2 and the channel information 610 supplied by UE 1. In one implementation, the power allocation algorithm described in this disclosure is used to determine the power allocation 626 to UE 2, and in particular, the amplitude factor $\sqrt{P_{l,i}}$ used by UE 2.

It is understood from the foregoing that power allocation to a UE may be determined based on serving links from serving BSs as well as interfering links from interfering BSs. This is particularly useful when the UE is experiencing interference from one or more BSs in an adjacent cell or sector. Furthermore, the channel information from serving and interfering BSs may be leveraged by a power allocation algorithm to determine an optimum amplitude factor for use by a UE. In an alternative implementation, the UE or BS may use the channel information from serving and interfering BSs to reference a lookup table that includes amplitude factors tied to reference channel information for use by the UE based on the channel information from serving and interfering BSs.

As is illustrated in FIG. 6, in step 2, a modulation and coding scheme (MCS) to change a UE transmission data rate, based on the channel condition (characterized by channel quality indicator (CQI)), is determined.

As part of the MCS determination process, UE 1 may receive a reference signal 602 from a serving BS 1 and a reference signal 604 from an interfering BS 2. Furthermore, UE 2 may receive a reference signal 606 from the serving BS 2 and a reference signal 608 from the interfering BS 1. The reference signal 602 enables the UE 1 to obtain channel information from BS 1. Similarly, the reference signal 604 enables the UE 1 to obtain channel information from BS 2. In a similar manner, the reference signal 606 enables the UE 2 to obtain channel information from BS 2, which is the serving BS. Similarly, the reference signal 608 enables the UE 2 to obtain channel information from BS 1, which is the interfering BS.

In the case of the MCS determination process, the channel information obtained by the UE 1 is formulated as a CQI measurement 628 that is sent 630 to the BS 1. Note, that the CQI measurement 628 includes the MCS of each substream from the serving BS 1 and the interfering BS 2. Furthermore, the channel information obtained by the UE 2 is formulated as a CQI measurement 632 that sent 634 to the BS 2. At 636, BS 1 shares the CQI measurement 628 with BS 2. Furthermore, at 636, BS 2 shares the CQI measurement 632 with BS 1. Note that the CQI measurement 632 includes the MCS of each substream from the serving BS 2 and the interfering BS 1.

At 638, BS 1 determines the MCS 640 for UE 1 is based on the CQI measurement 628 supplied by UE 1 and the CQI measurement 632 supplied by UE 2. Note that the MCS 640 includes the MCS of each substream from the serving BS 1 and the interfering BS 2. At 642, BS 2 determines the MCS 644 for UE 2 is based on the CQI measurement 632 supplied by UE 2 and the CQI measurement 628 supplied by UE 1. Note that the MCS 644 includes the MCS of each substream from the serving BS 2 and the interfering BS 1.

Additional and Alternative Implementation Notes

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

As it employed herein, the term "processor" can refer to a classical architecture or a quantum computer. Classical architecture comprises, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment. A processor may also be implemented as a combination of computing devices, e.g., a combination of a DSP and a microprocessor, a plurality of microprocessors, one or more microprocessors in conjunction with a DSP core, or any other such configuration.

Furthermore, in the subject specification, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems and/or methods herein are intended to comprise, without being limited to, these and any other suitable types of memory.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Note that the order in which the implementations and processes are described is not intended to be construed as a limitation, and any number of the described implementations and processes may be combined.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms "coupled" and "connected" may have been used to describe how various elements interface. Such described interfacing of various elements may be either direct or indirect.

What is claimed is:

1. An apparatus of a first access point (AP) configured for coordinated power allocation, the apparatus comprising:
   memory; and
   processing circuitry coupled to the memory, configured to:
   determine first channel state information (CSI) for a first channel between the first AP and a first station, the first CSI based on a communication between the first station and the first AP;
   determine second CSI for a second channel between the first AP and a second station, the second CSI determined based on a communication between the second station and a second AP, the first and second channels comprising subcarriers;
   calculate an expected signal-to-interference-plus-noise ratio (SINR) for the first station based on the first CSI, the second CSI and an initial subcarrier power allocation for the first station;
   calculate an expected SINR for the second station based on the first CSI, the second CSI and an initial subcarrier power allocation for the second station;
   perform an iterative power allocation process to determine a final subcarrier power allocation for the first station and a final subcarrier power allocation for the second station, the final subcarrier power allocations based on the initial subcarrier power allocations and the expected SINRs, the iterative power allocation process to increase aggregate throughput;
   provide information indicative of the final subcarrier power allocation for the second station to the second AP for a second transmission by the second AP to the second station; and
   configure transceiver circuitry of the first AP for a first transmission to the first station, the transceiver circuitry configured to set subcarrier transmit power levels based on the final subcarrier power allocation for the first station, the first transmission being a multiple-input multiple output (MIMO) transmission.

2. The apparatus of claim 1 wherein the transceiver circuitry is configured to set a transmit power level of each subcarrier of the MIMO transmission based on the final subcarrier power allocation for the first station.

3. The apparatus of claim 2 wherein processing circuitry is configured to store the final subcarrier power allocation for the first station in the memory.

4. The apparatus of claim 3, wherein the final subcarrier power allocation for the first station indicates one or more subcarriers to be allocated a higher power, and
   wherein corresponding subcarriers of the final subcarrier power allocation for the second station are allocated a lower power.

5. The apparatus of claim 3, wherein the final subcarrier power allocation for the first station indicates one or more subcarriers to be allocated zero power, and
   wherein corresponding subcarriers of the final subcarrier power allocation for the second station are allocated non-zero power.

6. The apparatus of claim 5 wherein the transmission by the first AP to the first station is encoded to indicate which of the subcarriers are to be decoded by the first station, wherein subcarriers that are allocated zero power are not indicated to be decoded.

7. The apparatus of claim 6 further comprising an encoder to encode the transmission to the first station.

8. The apparatus of claim 3 wherein the first and second channels comprise corresponding orthogonal frequency division multiplexed (OFDM) subcarriers, and
   wherein the iterative power allocation process is configured to maximize the aggregate throughput, the aggregate throughput being a sum of throughputs of the first and second transmissions.

9. The apparatus of claim 2, wherein the first CSI is determined from a channel quality indicator (CQI), and
   wherein the processing circuitry is further configured to determine a modulation and coding scheme (MCS) for the first transmission, the MCS being signaling in the first transmission.

10. The apparatus of claim 2, wherein the first and second transmissions each comprise a plurality of substreams.

11. The apparatus of claim 2 wherein the first access point is configured to implement a time-division multiplexing (TDM) scheme for transmissions to and from the first station.

12. The apparatus of claim 2 wherein the first and second channels comprise interfering channels comprising non-orthogonal subcarriers, and wherein the first transmission to the first station is configured to be concurrent with the second transmission.

13. A non-transitory computer-readable storage medium that stores instructions for execution by processing circuitry of a first access point (AP) to configure the first AP to perform operations to:
   determine first channel state information (CSI) for a first channel between the first AP and a first station, the first CSI based on a communication between the first station and the first AP;

determine a second CSI based on a communication between a second station and a second AP, the second CSI for a second channel between the first AP and the second station;

calculate an expected signal-to-interference-plus-noise ratio (SINR) for the first station based on the first CSI, the second CSI and an initial subcarrier power allocation for the first station;

calculate an expected SINR for the second station based on the first CSI, the second CSI and an initial subcarrier power allocation for the second station;

perform an iterative power allocation process to determine a final subcarrier power allocation for the first station and a final subcarrier power allocation for the second station, the final subcarrier power allocations based on the initial subcarrier power allocations and the expected SINR for the first station and the expected SINR for the second station, the iterative power allocation process to increase aggregate throughput;

provide information indicative of the final subcarrier power allocation for the second station to the second AP for a second transmission by the second AP to the second station; and configure transceiver circuitry of the first AP for a first transmission to the first station, the transceiver circuitry configured to set subcarrier transmit power levels based on the final subcarrier power allocation for the first station, the first transmission being a multiple-input multiple output (MIMO) transmission.

14. The apparatus of claim 13 wherein the first transmission to the first station is configured to be concurrent with the second transmission.

15. The apparatus of claim 13 wherein the first and second channels are interfering channels comprising a plurality of subcarriers.

16. The apparatus of claim 15, wherein the final subcarrier power allocation for the first station indicates one or more subcarriers to be allocated a higher power, and wherein corresponding subcarriers of the final subcarrier power allocation for the second station are allocated a lower power.

17. A method performed by a first access point (AP) for coordinated power allocation, the method comprising:

determining first channel state information (CSI) for a first channel between the first AP and a first station, the first CSI based on a communication between the first station and the first AP;

determining a second CSI based on a communication between a second station and a second AP, the second CSI for a second channel between the first AP and the second station;

calculating an expected signal-to-interference-plus-noise ratio (SINR) for the first station based on the first CSI, the second CSI and an initial subcarrier power allocation for the first station;

calculating an expected SINR for the second station based on the first CSI, the second CSI and an initial subcarrier power allocation for the second station;

performing an iterative power allocation process to determine a final subcarrier power allocation for the first station and a final subcarrier power allocation for the second station, the final subcarrier power allocations based on the initial subcarrier power allocations and the expected SINR for the first station and the expected SINR for the second station, the iterative power allocation process to increase aggregate throughput;

providing information indicative of the final subcarrier power allocation for the second station to the second AP for a second transmission by the second AP to the second station; and configuring transceiver circuitry of the first AP for a first transmission to the first station during the second transmission, the transceiver circuitry configured to set subcarrier transmit power levels based on the final subcarrier power allocation for the first station, the first transmission being a multiple-input multiple output (MIMO) transmission.

* * * * *